(12) United States Patent
Liu

(10) Patent No.: US 10,549,624 B2
(45) Date of Patent: Feb. 4, 2020

(54) DUAL ELECTRIC MACHINE CO-DRIVE SYSTEM WITH SELECTIVE BOOSTER OF ELECTRIC MACHINE

(71) Applicant: GM GLOBAL TECHNOLOGY OPERATIONS LLC, Detroit, MI (US)

(72) Inventor: Bradford P. Liu, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 129 days.

(21) Appl. No.: 15/729,145

(22) Filed: Oct. 10, 2017

(65) Prior Publication Data

US 2019/0105980 A1 Apr. 11, 2019

(51) Int. Cl.
| | |
|---|---|
| B60K 6/44 | (2007.10) |
| B60K 6/543 | (2007.10) |
| B60K 6/365 | (2007.10) |
| F16H 3/72 | (2006.01) |

(52) U.S. Cl.
CPC ............. *B60K 6/543* (2013.01); *B60K 6/365* (2013.01); *B60K 6/44* (2013.01); *F16H 3/728* (2013.01); *B60Y 2200/92* (2013.01); *F16H 2200/201* (2013.01); *F16H 2200/2038* (2013.01); *Y10S 903/911* (2013.01); *Y10S 903/918* (2013.01)

(58) Field of Classification Search
CPC .......... B60K 6/543; B60K 6/44; B60K 6/365; F16H 3/728; F16H 2200/201
See application file for complete search history.

(56) References Cited

U.S. PATENT DOCUMENTS

| | | | |
|---|---|---|---|
| 6,953,409 B2 | 10/2005 | Schmidt | |
| 7,101,298 B2 * | 9/2006 | Sowul | B60K 6/365 475/5 |
| 7,427,252 B2 | 9/2008 | Holmes | |
| 7,597,648 B2 * | 10/2009 | Conlon | B60K 6/365 180/65.7 |
| 7,918,756 B2 * | 4/2011 | Goldschmidt | B60K 6/26 475/5 |
| 8,066,609 B2 * | 11/2011 | Kersting | B60K 6/365 475/275 |
| 8,096,909 B2 * | 1/2012 | Kim | B60K 6/365 475/275 |
| 8,152,668 B2 * | 4/2012 | Kersting | B60K 6/26 475/5 |
| 8,313,402 B2 * | 11/2012 | Park | B60K 6/365 475/275 |

(Continued)

*Primary Examiner* — Patrick H Mackey
(74) *Attorney, Agent, or Firm* — Reising Ethington P.C.; Sten Schuler

(57) ABSTRACT

A hybrid drivetrain for a vehicle may include a co-drive manipulator having a first input configured to be driven by an internal combustion engine, and a second input configured to be driven by a first electric machine. The hybrid drivetrain may also include a selective booster having first and second planetary gearsets, each of the first and second planetary gearsets having a rotating component secured for rotation with a rotatable shaft driven by the co-drive manipulator, such that a rotational input received at the second planetary gearset from a second electric machine selectively drives the output shaft with a plurality of gear ratios including at least a speed reduction gear ratio and a speed increasing gear ratio.

18 Claims, 4 Drawing Sheets

(56) References Cited

U.S. PATENT DOCUMENTS

| | | | | |
|---|---|---|---|---|
| 8,475,312 B2 * | 7/2013 | Park | ................... | B60K 6/365 475/276 |
| 8,579,750 B2 * | 11/2013 | Park | ................... | B60K 6/365 475/282 |
| 8,708,853 B2 * | 4/2014 | Bucknor | ............. | B60K 6/365 475/4 |
| 8,790,201 B2 * | 7/2014 | Holmes | .............. | B60K 6/365 475/5 |
| 8,840,498 B2 * | 9/2014 | Park | ................... | B60K 6/365 475/282 |
| 8,882,627 B2 * | 11/2014 | Kersting | ............. | B60K 6/26 475/275 |
| 9,222,554 B1 * | 12/2015 | Hwang | ............... | F16H 3/728 |
| 9,316,291 B2 * | 4/2016 | Lee | .................... | F16H 3/727 |
| 9,321,342 B2 | 4/2016 | Liu | | |
| 9,371,892 B2 * | 6/2016 | Lee | .................... | B60K 6/445 |
| 9,387,757 B2 * | 7/2016 | Scholz | ............... | B60K 6/365 |
| 2007/0099748 A1 | 5/2007 | Matsubara | | |
| 2012/0270691 A1 * | 10/2012 | Tuckfield | ............. | F16H 3/728 475/5 |

* cited by examiner

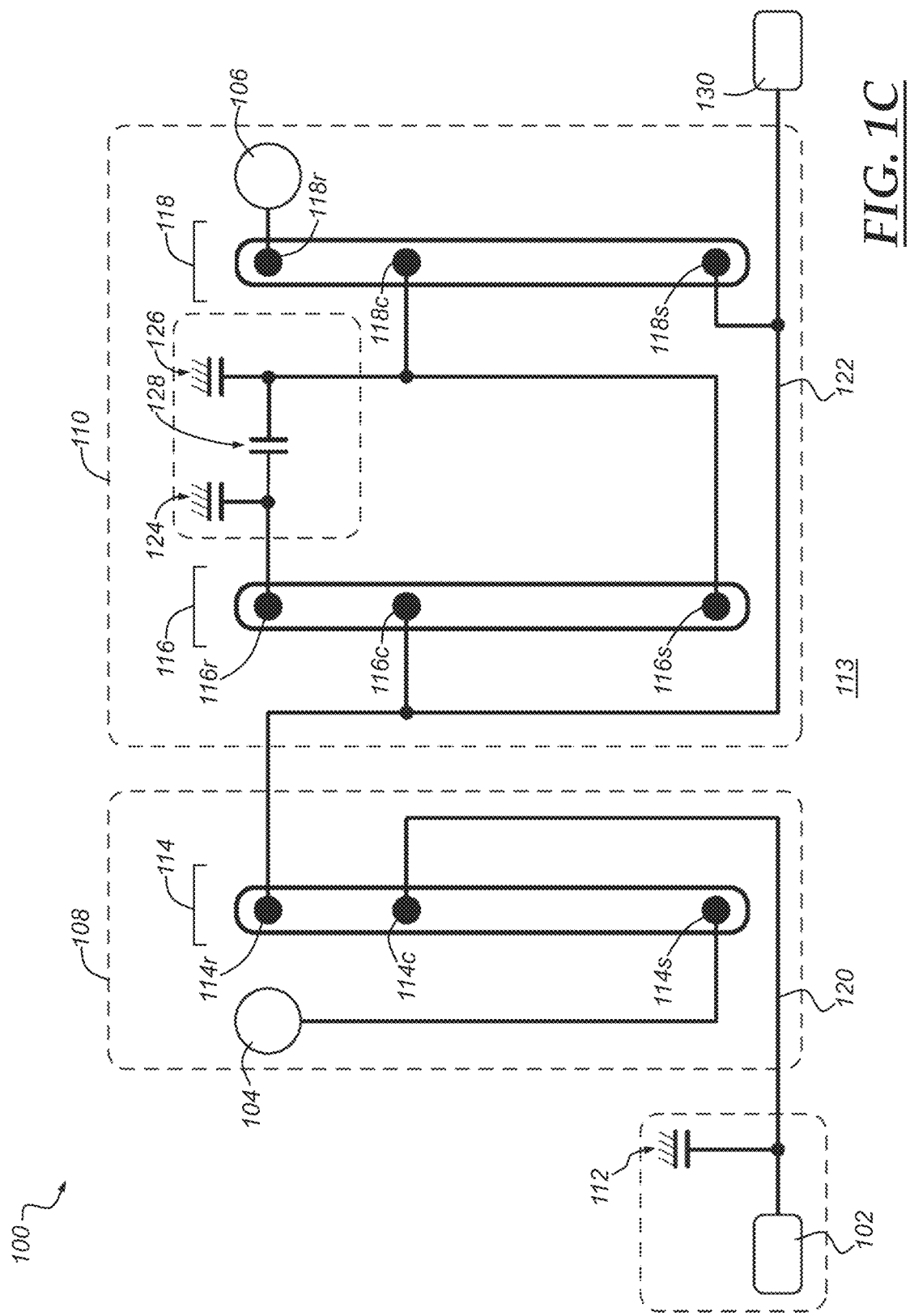

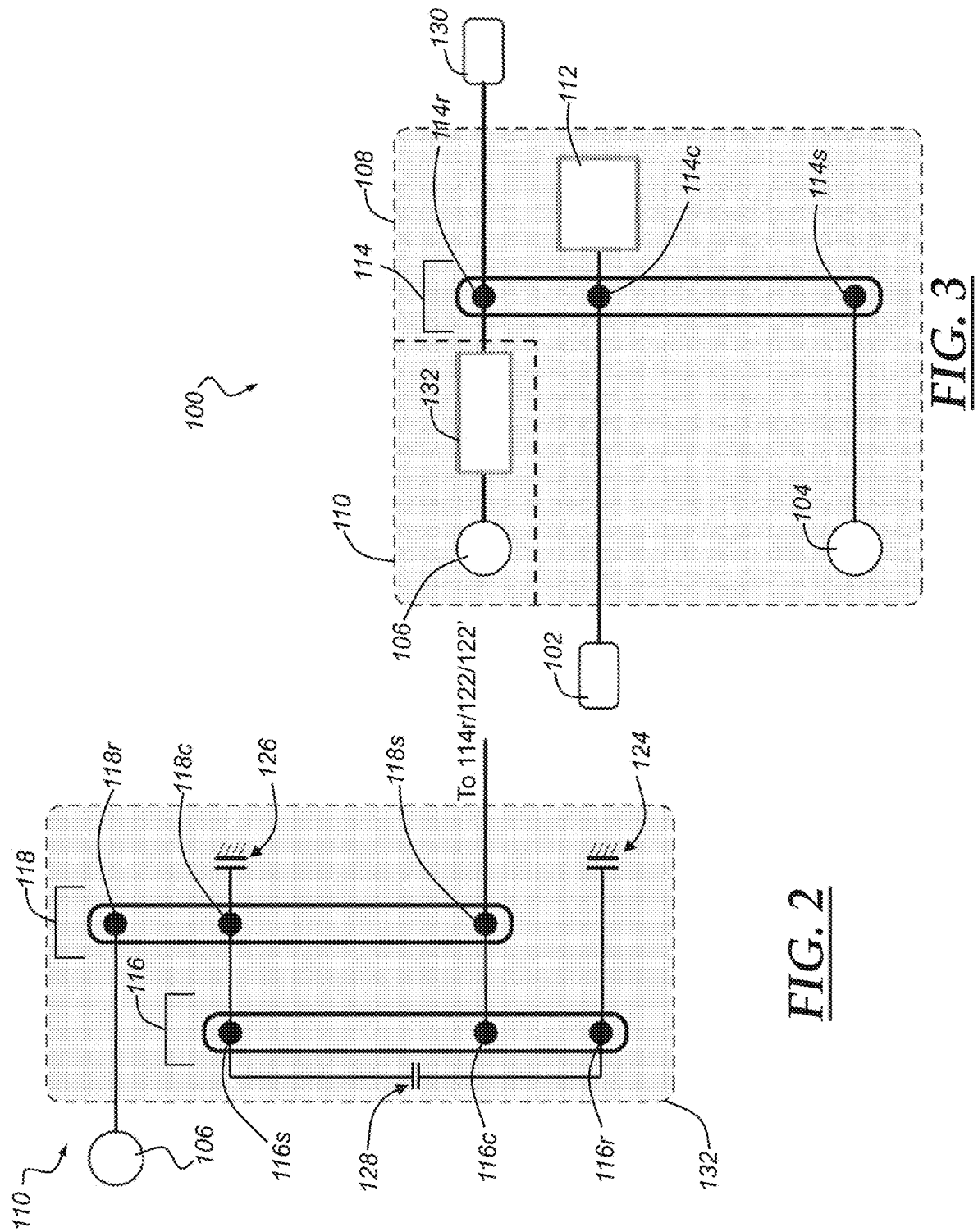

DUAL ELECTRIC MACHINE CO-DRIVE SYSTEM WITH SELECTIVE BOOSTER OF ELECTRIC MACHINE

INTRODUCTION

Hybrid drive vehicles typically employ a combination of an internal combustion engine and at least one electric machine. The electric machine is typically a motor-generator, such that it may selectively impart rotational force to the vehicle drivetrain to propel the vehicle, or generate electrical power for storage in a vehicle battery. The hybrid vehicle may provide power to the wheels using the electric machine, internal combustion engine, or both.

Electric machines typically have a defined range of operating efficiency where they provide the greatest amount of rotational force or power relative to electrical power consumed. Greater ranges of operating efficiency necessarily increase complexity and/or cost of the electric machines. As a result, manufacturers typically must draw a compromise in the electric machine design, and sacrifice efficiency at lower electric machine speed for greater efficiency at higher electric machine speed, or vice versa. Hybrid vehicles therefore often employ electric machines at a limited range of speeds, e.g., only at speeds below a predetermined threshold.

Accordingly, there is a need for an improved hybrid driveline that addresses the above problems.

SUMMARY

In one example illustration, there is provided a hybrid vehicle comprising an internal combustion engine and a plurality of electric machines. The vehicle may also include a hybrid drivetrain. In at least one example, the hybrid drivetrain includes a co-drive manipulator and a selective booster for an electric machine. The co-drive manipulator may have a first input configured to be driven by an internal combustion engine, and a second input configured to be driven by a first electric machine. The hybrid drivetrain may also include a selective booster having first and second planetary gearsets. The planetary gearsets may include a ring gear, sun gear, and a plurality of planet gears disposed therebetween which are maintained in spaced relation about the sun gear by a rotatable planet gear carrier. Each of the first and second planetary gearsets may have a rotating component secured to a rotatable shaft for rotation therewith, such that a rotational input received at the second planetary gearset from a second electric machine selectively drives the rotatable shaft with a plurality of gear ratios including at least a speed reducing (i.e., a speed reduction or underdrive gear) ratio and a speed increasing (i.e., an overdrive gear) ratio.

Optionally, the hybrid drivetrain may include a rotational clutch configured to selectively restrict relative rotation between components of the first and second planetary gearsets, such as a first ring gear of the first planetary gearset and a second planet gear carrier of the second planetary gearset. The rotational clutch may also be configured to selectively restrict rotation of a second planet gear carrier of the second planetary gearset with respect to a first ring gear of the first planetary gearset.

In some examples, the hybrid drivetrain may also include a first brake clutch configured to selectively restrict rotation of the first ring gear. In at least some examples, the brake clutch is configured to restrict rotation of a sun gear of the first planetary gearset and a planet gear carrier of the second planetary gearset. A second brake clutch may be provided in at least one example approach, with the second brake clutch being configured to selectively restrict rotation of the second planet gear carrier.

Optionally, an input brake clutch may be provided, which is configured to selectively restrict rotation of the first input, e.g., from the internal combustion engine.

In at least some approaches, components of the planetary gearsets may be linked with one another for synchronized rotation. For example, the second planet gear carrier may be linked to a first sun gear of the first planetary gearset for rotation therewith. Similarly, the first planetary gearset may include a first sun gear secured to a second planet gear carrier of the second planetary gearset for rotation therewith.

Optionally, the co-drive manipulator includes a third planetary gearset (in addition to those of the selective booster). In these examples, the first input may be a planetary gear carrier of the third planetary gearset, the second input may be a sun gear of the third planetary gearset, and/or the rotatable shaft may be driven by a ring gear of the third planetary gearset.

The rotatable shaft may be co-axially arranged with respect to the co-drive manipulator and rotating components thereof, or may be offset, e.g., in a layshaft arrangement.

In some example approaches, a selective booster for an electric machine in a hybrid drivetrain comprises first and second planetary gearsets. The first planetary gearset may include a first ring gear, a first planet gear carrier, and a first sun gear, with the first planet gear carrier secured to a rotatable shaft for rotation therewith. The second planetary gearset may have a second ring gear configured to receive an input from an electric machine, a second planet gear carrier secured to the first sun gear for rotation therewith, and a second sun gear secured to the rotatable shaft for rotation therewith. The first and second planetary gearsets may cooperate to provide a plurality of gear ratios between the second ring gear and the rotatable shaft, including at least a speed reduction gear ratio and a speed increasing gear ratio.

In at least some examples, a selective booster for an electric machine includes a rotational clutch configured to selectively fix rotating components of the first and second planetary gearsets for rotation therewith, e.g., the first ring gear of the first planetary gearset to the second planet gear carrier of the second planetary gearset, to provide a unity gear ratio. The selective booster may also include a first brake clutch configured to selectively restrict rotation of the first ring gear with respect to a stationary housing, and a second brake clutch configured to selectively restrict rotation of the second planet gear carrier with respect to the stationary housing.

BRIEF DESCRIPTION OF THE DRAWINGS

One or more embodiments of the invention will hereinafter be described in conjunction with the appended drawings, wherein like designations denote like elements, and wherein:

FIG. 1C is a lever diagram depicting the drivetrains of FIGS. 1A and 1B;

FIG. 2 is a lever diagram depicting a selective booster for the drivetrains of FIGS. 1A-1C; and FIG. 3 is a lever diagram depicting the drivetrains of FIGS. 1A-1C, illustrating example connections with an internal combustion engine and two electric machines.

DETAILED DESCRIPTION

Figure 1A:
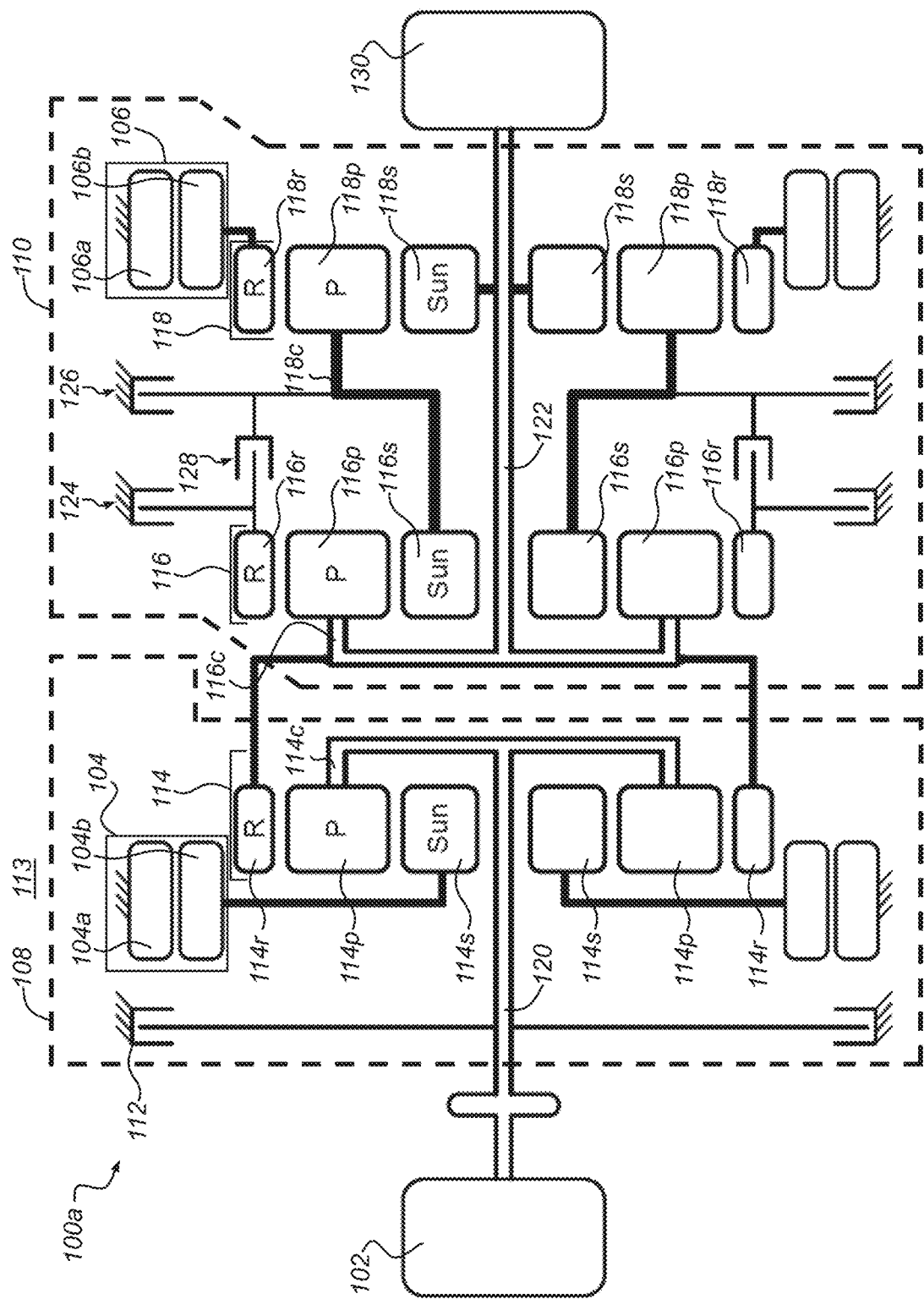
FIG. 1A is a schematic diagram depicting an embodiment of a drivetrain in a sectional view, e.g., for a hybrid vehicle, utilizing a co-axial configuration.

Example illustrations are provided of a hybrid drivetrain for a vehicle employing an internal combustion engine and at least one electric motor-generator or electric machine. The example illustrations may facilitate optimal utilization of multiple electric machines in a hybrid mode, i.e., where the internal combustion engine and one or more electric machines are used to supply power to vehicle wheels, and in an electric vehicle mode, where only the electric machine(s) are used to supply power.

In one example, optimal utilization of two electric machines employed in co-drive (i.e., where each electric machine is providing power to vehicle wheels) is facilitated under both hybrid mode and EV mode by way of a selective booster of a primary one of the electric machines. More specifically, the selective booster may be used to facilitate use of the primary electric machine in a relatively low speed range (where the primary electric machine is employed as an underdrive torque booster) and a relatively high-speed range (where the primary electric machine is employed as an overdrive speed booster). Moreover, a co-drive hybrid system, i.e., where multiple electric machines are employed, may advantageously allow use of relatively smaller electric machines instead of a single electric machine. In other words, hybrid systems employing a single electric machine will generally require a much larger electric machine.

Example illustrations of a hybrid drivetrain may employ, for example, two brake clutches, e.g., as components of the selective booster, to manipulate power of a primary one of the electric machines for a low-speed range and a high-speed range, respectively. Additionally, a rotational clutch may be used to provide a unity drive (i.e., a gear ratio of 1:1) for the electric machine. In this manner, a robust propulsion architecture is provided for both hybrid and electric modes, which facilitates optimal electric machine utilization and power manipulation.

Example drivetrain architectures disclosed herein are generally compact and modular, and may be executed in co-axial or layshaft arrangements. Accordingly, example drivetrains disclosed herein may be executed in transverse engine/transmission configurations (typical of front-wheel drive and electric all-wheel drive configurations) or longitudinal engine transmission configurations (typical of rear-wheel drive and all-wheel drive configurations), and in any vehicle size segment that is convenient.

As will be described further below, example vehicle drivetrains may provide motive force to a final drive unit by way of a co-drive manipulator, for example a planetary gearset. The planetary gearset may include a sun gear, a plurality of planet gears, a planet gear carrier maintaining the planet gears in spaced relation about the sun gear, and a ring gear. The sun gear, planet gears, and ring gear may have any size or number of gear teeth that is convenient to ensure operation of the planetary gearset. (For example, the ring gear generally has a larger number of gear teeth than the sun gear and individual planet gears, as will be discussed further below.) In at least some examples, planetary gearsets together provide a plurality of gear ratios to an output, e.g., the final drive unit or an intermediate shaft of the planetary gearset(s), from at least a primary electric machine of the drivetrain. Planetary gearsets may provide, in effect, a shiftable gearbox for one of the electric machines, e.g., a primary electric machine, such that a plurality of gear ratios including at least a speed-reducing gear ratio, i.e., a speed reduction or underdrive gear, and a speed increasing gear ratio, i.e., an overdrive gear, is available between one of the electric machines and the output shaft (or, in the case of a layshaft configuration, the layshaft). The availability of both an underdrive and overdrive gear ratio allows the optimal operating speeds of the electric machine to be spread over a wider range of vehicle operating speeds. This flexibility may be further enhanced by the provision of a unity gear ratio (i.e., 1:1), further spreading a relatively narrow range of optimal electric machine speeds for use across a wider range of vehicle speeds.

Figure 1B:
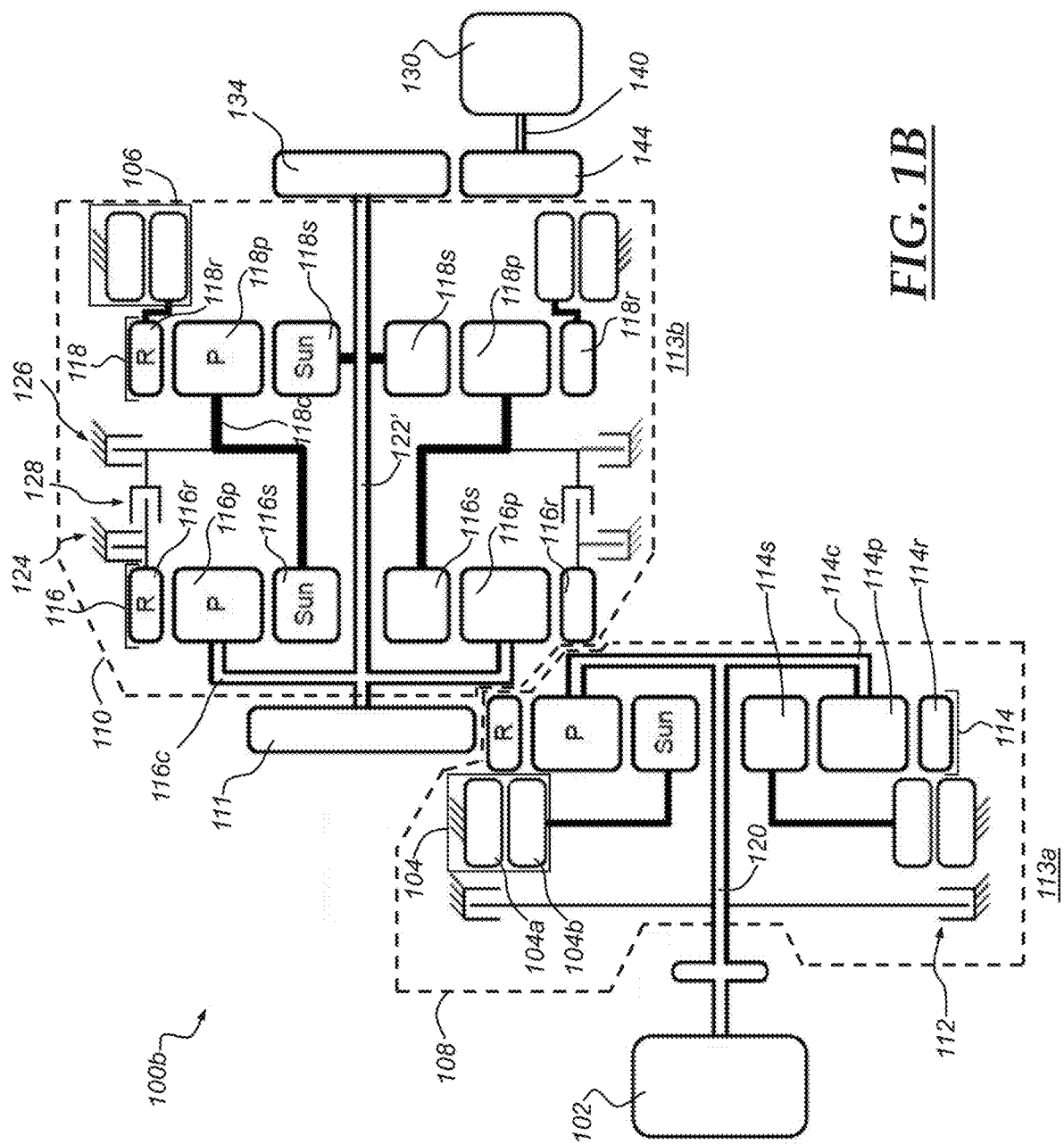
FIG. 1B is a schematic diagram depicting an embodiment of a drivetrain in a sectional view, e.g., for a hybrid vehicle, utilizing a layshaft configuration.

Turning now to FIGS. 1A-1C, example vehicle drivetrains 100a, 100b (collectively, 100) are illustrated. The vehicle drivetrains 100 may be used in a hybrid vehicle and, as noted above, may be executed in a co-axial configuration, an example of which is illustrated in FIG. 1A, or in an offset/layshaft configuration, an example of which is illustrated in FIG. 1B. In each of the diagrams illustrated in FIGS. 1A and 1B, rotating components are generally illustrated in section. A lever diagram applicable to each configuration is illustrated in FIG. 1C, and will be used in conjunction with the description of operation of the example drivetrains that follows.

In each of FIGS. 1A-1C, a vehicle drivetrain 100 provides power to a vehicle final drive 130 using, in a variety of modes that will be described further, an internal combustion engine 102, a first electric machine 104, and a second electric machine 106. The internal combustion engine 102 illustrated is a gasoline/spark ignition engine, but it should be understood that no there is generally no limitation on what type of internal combustion engine may be employed. Merely as one example, the internal combustion engine 102 may be a diesel/compression ignition engine. The electric machines 104, 106 may each be motor-generators. In other words, the electric machines 104, 106 may each be capable of selectively providing motive power to vehicle wheel(s) by way of the final drive 130. When the electric machines 104, 106 are not supplying motive power to the final drive 130, they may generate electrical energy from drivetrain motion, which may be stored in one or more vehicle batteries (not shown) in electrical communication with the electric machines 104, 106.

As shown in each of FIGS. 1A-1C, the engine 102 and electric machines 104, 106 each selectively impart motion to the final drive 130 by way of a plurality of planetary gearsets 114, 116, and 118. The electric machines 104, 106 may also selectively generate electrical power from motion of the planetary gearset(s) 114, 116, and 118. To this end, the electric machines 104, 106 may each include a stator 104a, 106a and rotor 104b, 106b, respectively. The rotor 104b may rotate about an axis defined by shaft 120, while the rotor 106b may rotate about an axis defined by a rotatable shaft 122 (or, in the case of the example in FIG. 1B, layshaft 122', as will be described further below) associated with the planetary gearsets 116, 118. Rotating components of the planetary gearsets 114, 116, and 118 described below may also generally rotate about an axis defined by the shafts 120, 122, or 122', as will be understood from the illustrations and following description.

The planetary gearsets 114, 116, and 118 may have any configuration that is convenient, and may generally operate according to planetary or epicyclic gearset principles, i.e., where rotation of various components thereof is used to provide different input/output gear ratios. The planetary gearsets 114, 116, and 118 each generally include a sun gear 114s, 116s, and 118s disposed generally centrally within the planetary gearsets 114, 116, and 118, respectively, and defining a plurality of outwardly extending gear teeth (not shown). The planetary gearsets 114, 116, and 118 may further include a ring gear 114r, 116r, and 118r, respectively, which is disposed radially outwardly from its respective sun gear 114s, 116s, and 118s, and defines a plurality of radially inwardly extending gear teeth (not shown). Further, the planetary gearsets 114, 116, and 118 may each include a plurality of planet gears 114p/116p/118p, with each plurality of planet gears 114p/116p/118p being disposed radially between the respective ring gear 114r/116r/118r and sun gear 114s/116s/118s. The planet gears may each define a plurality of gear teeth (not shown) which are enmeshed with those of their adjacent ring gear 114r/116r/118r and sun gear 114s/116s/118s. Each of the planetary gearsets also include a planet carrier 114c, 116c, and 118c, which maintains the planet gears 114p/116p/118p in spaced relation about the sun gears 114s, 116s, and 118s and is rotated in synchronization with the centers of the planet gears 114p/116p/118p.

Referring now to FIGS. 1A and 1C, the drivetrain 100 may be considered as being generally comprised of a co-drive manipulator 108 and a selective booster 110, each of which cooperate to impart motion to the final drive 130 (and, in the case of the electric machines 104, 106, to provide rotational motion to the electric machines 104, 106 to generate electrical power). More specifically, the co-drive manipulator 108 and selective booster 110 are each linked to a rotatable shaft, e.g., an output shaft 122 (as in FIG. 1A) or layshaft 122' (as in FIG. 1B).

As illustrated in FIGS. 1A and 1C, the driveline 100a is a co-axial arrangement where the output shaft 122 is aligned parallel with a rotating shaft 120 of the manipulator 108. The co-drive manipulator 108 has a first input configured to be driven by the engine 102, in the form of the planetary gear carrier 114c of the planetary gearset 114. A second input, in the form of the sun gear 114s of the planetary gearset 114, is linked for rotation with the electric machine 104. The ring gear 114r, in turn, is secured to the shaft 122 and the planetary gear carrier 116c of the planetary gearset 116. Alternatively, in the layshaft configuration illustrated in FIG. 1B, the shaft 120 is offset from the rotatable shaft 122' of the selective booster 110, as will be discussed further below.

As best seen in FIGS. 1A and 1B, the selective booster 110 may include the two planetary gearsets 116, 118, each of which cooperate to impart motion to the final drive unit 130 from the electric machine 106. When not actively imparting motion to the final drive unit 130, the electric machine 106 may also generate electrical power in response to rotational inputs received from the planetary gearsets 116, 118. Each of the planetary gearsets 116, 118 have a rotating component secured to the shaft 122 for rotation therewith. More specifically, the planetary gear carrier 116c of the planetary gearset 116 and the sun gear 118s of the planetary gearset 118 are each secured to the shafts 122 or 122' for rotation therewith.

The planetary gearsets 116, 118 cooperate to provide a plurality of gear ratios for the electric machine 106 to drive the shaft 122 or 122'. More specifically, the electric machine 106 is coupled to the ring gear 118, either directly or by way of additional gearing (not shown in FIGS. 1A-1C). Accordingly, the ring gear 118r of the planetary gearset 118 is an input for the electric machine 106 to provide rotational motion to the shaft 122 or 122' (and, ultimately, to the final drive unit 130). The ring gear 118r, moreover, selectively drives the shaft 122 or 122' with a plurality of gear ratios including at least a reduction gear ratio (i.e., where the shaft 122/122' is turning more slowly than the ring gear 118r) and an overdrive gear ratio (i.e., where the shaft 122/122' is turning faster than the ring gear 118r) by way of the planetary gearsets 116 and 118, as will be described further below. In some examples, moreover, a unity gear ratio (i.e., where the shaft 122/122' is turning at the same speed as the ring gear 118r) may be provided in addition to the underdrive and overdrive gear ratios. The planetary gearsets 116, 118, moreover, provide the plurality of gear ratios in a relatively compact and inexpensive arrangement.

The plurality of gears provided by the planetary gearsets 116, 118 may be enacted with one or more clutches, which may selectively secure rotating components of the planetary gearsets 116, 118 together for rotation, or selectively restrain rotation of components of the planetary gearsets 116, 118 to a stationary housing 113, as will be described further below.

More specifically, as best seen in FIGS. 1A and 1B, the planet gear carrier 118c of the planetary gearset 118 is secured to sun gear 116s of the planetary gearset 116. Additionally, both the planet gear carrier 116c of the planetary gearset 116 and the sun gear 118s of the planetary gearset 118 are secured to the shaft 122 or 122' for rotation therewith.

Additionally, a brake clutch 124 selectively restricts rotation of ring gear 116r of the planetary gearset 116 relative to a stationary housing 113 (or, in the example of FIG. 1B, housing 113b) of the drivetrain. A second brake clutch 126 is configured to selectively restrict rotation of the planet gear carrier 118c relative to housing 113/113b. Moreover, since the planet gear carrier 118c is secured to the sun gear 116s for rotation therewith, the brake clutch 126 also may selectively restrict rotation of the sun gear 116s with respect to the housing 113. As will be described further below, the brake clutches 124, 126 may selectively create different effective gear ratios between an input of the electric machine 106, i.e., ring gear 118r, and the shaft 122 or 122', that includes both an underdrive gear ratio and an overdrive gear ratio.

As also illustrated, a rotational clutch 128 may be provided, which is configured to selectively fix rotating components of the planetary gearsets 116, 118 for rotation together, i.e., such that they rotate at a same speed. In some examples, fixing components of the planetary gearsets 116, 118 may create a unity gear ratio for the electric machine 106, i.e., with respect to the shaft 122 or 122'. For example, as illustrated in FIGS. 1A and 1C, the rotational clutch 128 is configured to selectively restrict rotation of the planet gear carrier 118c of the planetary gearset 118 with respect to the ring gear 116r of the planetary gearset 116. Moreover, as will be described further below, rotational clutch 128 may connect other rotating components of the planetary gearsets 116, 118 to create a unity gear ratio for the electric machine 106.

The drivetrain 100 may also include an input brake clutch 112, which selectively restricts rotation of the first input, i.e., shaft 120, relative to a stationary housing 113 (or, in the example of FIG. 1B, housing 113a). Accordingly, when the engine 102 is not in use, the input brake clutch 112 may be actuated to prevent rotation of the shaft 120 and, in turn, the planet gear carrier 114c of the planetary gearset 114. Engagement of the input brake clutch 112 therefore causes the planetary gearset 114 to have only one degree of freedom (as opposed to two degrees of freedom when the input brake clutch 112 is not actuated), allowing the two electric machines 104, 106 to be operated independently of the engine 102, as the shaft 120 is prevented from rotating. Additionally, the input brake clutch 112 may improve noise/ vibration/harshness characteristics of the drivetrain 100 by keeping otherwise rotatable components, e.g., shaft 120, stationary.

Actuation of the brake clutch 124 (and release of the brake clutch 126) may create a speed reducing or underdrive gear ratio between the ring gear 118r and the shaft 122 or 122', thereby increasing torque output by the electric machine 106 and functioning as a "torque booster." More specifically, the brake clutch 124 keeps the ring gear 116r stationary with respect to the housing 113. As a result, the electric machine 106 turns the ring gear 118r of the planetary gearset 118. The ring gear 118r causes the planetary gear carrier 118c to turn, thereby also rotating sun gear 116s (which is secured to the planetary gear carrier 118c for rotation therewith). As the ring gear 116r remains stationary, the rotation of the sun gear 116s causes the planetary gear carrier 116c to rotate. The output shaft 122 rotates at the same speed as the planetary gear carrier 116c. It should be noted that, as the sun gear 118s and planetary gear carrier 116c are secured to each other for synchronized rotation (by way of the shaft 122 or 122'), and the planetary gear carrier 118c and sun gear 116s are also secured to each other for synchronized rotation, that the sun gears 116s, 118s must each have an identical size/configuration. Additionally, the planet gears 116p, 118p associated with the planetary gear carriers 116c, 118c must each have an identical size/configuration. As the ring gear of a planetary gearset will generally always have more teeth than that of its associated sun gear, any gear size/tooth count of the relevant components of the planetary gearsets 116, 118 will result in an underdrive gear ratio when the brake clutch 124 is actuated.

Actuation of the brake clutch 126 (and release of the brake clutch 124), by contrast, may create a speed increasing or overdrive gear ratio between the ring gear 118r and the shaft 122 or 122', thereby increasing speed with respect to that of the electric machine 106, such that the selective booster is a "speed booster" for the electric machine 106 with respect to the shaft 122 or 122'. The brake clutch 126 maintains the planetary gear carrier 118c and sun gear 116s stationary. As a result, rotation of the ring gear 118r by the electric machine 106 imparts rotational motion to the sun gear 118s, which is secured to the shaft 122 or 122' for rotation therewith. As noted above, the ring gear of a planetary gearset will generally always have more teeth than that of its associated sun gear, and accordingly any gear size/tooth count of the relevant components of the planetary gearsets 116, 118 will create an overdrive gear ratio when the brake clutch 126 is actuated.

In examples where rotational clutch 128 is provided, a unity drive gear ratio may be created by securing components of the planetary gearsets 116, 118 together (and releasing the brake clutches 124 and 126), e.g., the planetary gear carrier 118c and the ring gear 116r. More specifically, rotation of the ring gear 118r by the electric machine 106 will impart rotation of the ring gear 116r and sun gear 116s at the same speed. Accordingly, the planetary gear carrier 116c will rotate at the same speed, turning the shaft 122 or 122' at the same speed as well. A unity drive gear ratio may provide additional flexibility by providing a further gear ratio in between the underdrive and overdrive ratios. Merely by way of example, the unity drive gear ratio may be useful in plug-in hybrid vehicles (which may have a relatively extended driving range in electric-only modes, in part due to a relatively larger battery pack) and larger vehicles, due to generally more strenuous duty cycles for the electric machine(s) in each.

As noted above, example drivetrains 100 may be provided in a co-axial or layshaft configuration. More specifically, the drivetrain 100a illustrated in FIG. 1A imparts rotational motion to the rotatable shaft 122 directly by way of the ring gear 114r, which is secured to the shaft 122 and planetary gear carrier 116c for rotation therewith. Accordingly, the shaft 122 is aligned co-axially with respect to shaft 120. Such a co-axial configuration may be convenient, merely as examples, in a rear-wheel drive or all-wheel drive vehicle.

By contrast, in other examples a layshaft configuration may be used, which generally may provide a more compact drivetrain. For example, as shown in FIG. 1B, drivetrain 100b is otherwise identical to drivetrain 100a, but uses a layshaft 122' that is offset with respect to the shaft 120 to transmit power to an output shaft 140 (in contrast to the coaxial shafts 120 and 122). For example, the ring gear 114r may be meshed with a spur gear 111, e.g., by way of external teeth on each (not shown). The gear 111, in turn, is secured to layshaft 122'. The layshaft 122' has an additional spur gear 134 at a distal end thereof. The gear 134, in turn, is meshed with a spur gear 144 that is secured to the output shaft 140. Accordingly, the layshaft 122' may drive or be driven by any fixed ratio gearing associated with the shaft 120 and/or the output shaft 140 that is convenient, e.g., the spur gears 111 and/or 134, respectively. Thus, the drivetrain 100b is functionally identical to the co-axial drivetrain 100a as both are represented by the lever diagram referring to each in FIGS. 1C, 2, and 3. (In FIG. 1C, the fixed ratio gearing provided by the spur gears 111, 134 in FIG. 1B is not shown.) In the coaxial drivetrain 100a, rotating components of the electric machine 106, gears 111 and 134, and rotating components of the planetary gearsets 116 and 118, each rotate about an axis associated with the rotating shaft 122. By contrast, in the layshaft drivetrain 100b, rotating components of the electric machine 106, spur gears 111 and 134, and rotating components of the planetary gearsets 116 and 118, each rotate about an axis associated with the rotatable layshaft 122'.

The layshaft configuration of the drivetrain 100b may offer a more compact design that lends itself to front-wheel drive or other applications where packaging space for the drivetrain is at a premium. A layshaft configuration may allow reductions in overall size of the drivetrain 100b as compared with a coaxial configuration, e.g., drivetrain 100a for several reasons. For example, the ring gear(s) in a layshaft configuration can be smaller, as an external fixed ratio gearing may be used to provide any convenient output speed(s) even with the smaller ring gear(s), e.g., by way of one or more spur gears as described above. Additionally, a layshaft and, for that matter, any other input/output shafts thereof, may be spatially positioned in different planes, further compacting the overall size of the drivetrain 100b. For example, in FIG. 1B the layshaft 122', output shaft 140, and input shaft 120 are non-coplanar with respect to each other (while appearing planar in the two-dimensional FIG. 1B).

Referring now to FIG. 2, which is a lever diagram of the selective booster 110 of the drivetrain 100a or 100b equivalent to the lever diagram of FIG. 1C, the operation of the selective booster 110 is described in further detail. The planetary gearsets 116, 118 in effect form a shiftable gearbox 132 providing a plurality of gear ratios for the electric machine 106 with respect to the shaft 122 or 122'. Moreover, as noted above the shaft 122 or 122' is also secured to the ring gear 114r of the planetary gearset 114 (not shown in FIG. 2) for rotation therewith. Accordingly, output of the engine 102 and/or electric machine 104 (each of which output power to the shaft 122 or 122' by way of the ring gear 114r) may be combined with the electric machine 106.

As shown in FIG. 2, when the brake clutch 124 is actuated, the ring gear 116r is prevented from rotation, and an underdrive gear ratio is created from the input ring gear 118r to the shaft 122 or 122'. More specifically, the electric machine 106 turns ring gear 118r, thereby rotating the planet carrier 118c and sun gear 116s together at a same speed. The stationary ring gear 116r causes the planet gear carrier 116c to rotate in response to the rotation of the sun gear 116s, thereby turning the shaft 122 or 122'. Moreover, the rotational speed of the shaft 122 or 122' is less than that of the input ring gear 118r, due to the reduction in angular velocity between the ring gear 118r and the rotating planet carrier 118c. It should be noted that the identical size/gear teeth configuration of the sun gears 116s, 118s and planet gears 116p, 118p of the planetary gearsets 116, 118 results in the sun gears 116s, 118s having a same rotational speed, and the planetary gear carriers 116c, 118c also having a same rotational speed. The shaft 122/122', which is secured to the planetary gear carrier 116c and sun gear 118s for rotation therewith, accordingly rotates at a reduced angular velocity with respect to the input ring gear 118r, thereby providing an underdrive gear ratio (the precise ratio of which may be determined by the particular configuration of the planetary gearsets 116 and 118, e.g., size/gear teeth of each of the sun gears 116s and 118s, ring gears 116r and 118r, and planet gears 116p, 118p) between the ring gear 118r and shaft 122/122'.

By contrast, when the brake clutch 126 is actuated (and brake clutch 124 released, allowing rotation of the ring gear 116r), the planet gear carrier 118c and sun gear 116s are each prevented from rotating. Accordingly, electric machine 106 turns ring gear 118r, and the rotating planet gears 118p (the centers of which are held stationary by the planet gear carrier 118c) turn the sun gear 118s. Moreover, the sun gear 118s turns at a faster speed than the input ring gear 118r, as a result of the increased angular velocity of the sun gear 118s with respect to the ring gear 118r while the planet gear carrier 118c is held stationary. Accordingly, the actuation of the brake clutch 126 creates an overdrive gear ratio (the precise ratio of which may be determined by the particular configuration of the planetary gearset 118, e.g., size/gear teeth of each of the sun gear 118s, ring gear 118r and planet gears 118p disposed therebetween) from the input ring gear 118r to the sun gear 118s.

The rotational clutch 128 is illustrated in FIG. 2 as selectively connecting ring gear 116r with planetary gear carrier 118c, to create a unity gear ratio from the input ring gear 118r to the shaft 122 or 122'. However, it should be understood that the rotational clutch 128 may be used to create any two independent nodes of the four nodes illustrated in the lever diagram of FIG. 2 to create a unity gear ratio from the input ring gear 118r to the shaft 122 or 122', thereby achieving the same design purpose as demonstrated by the rotational clutch 128 connection of the ring gear 116r with planetary gear carrier 118c.

Turning now to FIG. 3, which is a simplified lever diagram of the drivetrain 100, example operating modes of the vehicle drivetrain 100 are discussed in further detail. As noted above, the vehicle drivetrain 100 may utilize the engine 102 and one or both electric machines 104, 106 selectively in order to provide motive force to the final drive unit 130, and generate electrical energy that may be stored in one or more vehicle batteries (not shown). As shown in FIG. 3, the planetary gearset 114 generally provides an output to the final drive 130 by way of its ring gear 114r, with inputs received from the electric machine 104 at its sun gear 114s and from the internal combustion engine 102 at its planetary gear carrier 114c. Moreover, output of the electric machine 106 is received by way of the shiftable gearbox 132 at the ring gear 114r, which is secured for synchronized rotation with the shaft 122/122' (not shown in FIG. 3) and/or final drive unit 130.

In an electric vehicle mode, the input brake 112 may be actuated, thereby preventing rotation of the shaft 120 (see FIGS. 1A-1C) and the planetary gear carrier 114c. Accordingly, the vehicle may be driven by one or both of the electric machines 104, 106. In one example, the electric machine 106 is a primary electric machine with respect to the drivetrain 100, primarily or even exclusively providing motive force to the final drive unit 130. As the turning of the shaft 122/122' (see FIGS. 1A-1C) also turns the ring gear 114r, the sun gear 114s is in turn rotated, thereby providing rotational input to the electric machine 104, thereby allowing the electric machine 104 to generate electrical power for storage in a vehicle battery. Alternatively, the electric machine 104 may provide motive force to the drive unit 130 (at the same time as the electric machine 106 is also providing motive force to the final drive unit 130) by way of the sun gear 114s.

The engine 102 may be used to supplement power supplied to the final drive unit 130, e.g., when battery power associated with the electric machine(s) 104 and/or 106 is relatively low. Accordingly, the input brake 112 may be released, such that the engine 102 delivers motive force to the planetary gear carrier 114c, thereby outputting rotational force to the ring gear 114r. One or both of the electric machines 104 or 106 may be used to generate electrical power that recharges the vehicle battery/batteries by receiving rotational inputs via the shiftable gearbox 132. Moreover, the rotational input received from the ring gear 114r may be modified by way of the different gear ratios described above, thereby allowing a split between power of the engine 102 sent to the final drive unit 130 and sent to the electric machine 106 to be altered.

The example drivetrain 100 facilitates flexible use of an electric machine, e.g., electric machine 106, by way of a shiftable gearbox 132 comprised of a plurality of planetary gearsets. More specifically, the shiftable gearbox having at least overdrive and underdrive gear ratios allows a relatively narrow operating speed range of the electric machine 106 to be used flexibly to supply motive force to the vehicle wheel(s), or to generate electrical power from drivetrain movement, across a wider range of vehicle speeds.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A hybrid drivetrain for a vehicle, comprising:
a co-drive manipulator having a first input configured to be driven by an internal combustion engine, and a second input configured to be driven by a first electric machine; and
a selective booster including first and second planetary gearsets, each of the first and second planetary gearsets having a rotating component secured for rotation with a rotatable shaft driven by the co-drive manipulator, such that a rotational input received at the second planetary gearset from a second electric machine selectively drives the rotatable shaft with a plurality of gear ratios including at least a speed reduction gear ratio and a speed increasing gear ratio.

2. The hybrid drivetrain of claim 1, wherein the selective booster further comprises:
a rotational clutch configured to selectively fix a first ring gear of the first planetary gearset to a second planet gear carrier of the second planetary gearset for rotation therewith; and
a first brake clutch configured to selectively restrict rotation of the first ring gear.

3. The hybrid drivetrain of claim 1, further comprising a rotational clutch configured to selectively restrict relative rotation between components of the first and second planetary gearsets.

4. The hybrid drivetrain of claim 3, wherein the rotational clutch is configured to selectively restrict rotation of a second planet gear carrier of the second planetary gearset with respect to a first ring gear of the first planetary gearset.

5. The hybrid drivetrain of claim 4, wherein the second planet gear carrier is linked to a first sun gear of the first planetary gearset for rotation therewith.

6. The hybrid drivetrain of claim 2, further comprising a second brake clutch configured to selectively restrict rotation of the second planet gear carrier.

7. The hybrid drivetrain of claim 1, further comprising a brake clutch configured to restrict rotation of a sun gear of the first planetary gearset and a planet gear carrier of the second planetary gearset.

8. The hybrid drivetrain of claim 1, further comprising an input brake clutch configured to selectively restrict rotation of the first input.

9. The hybrid drivetrain of claim 1, wherein the first planetary gearset includes a first sun gear secured to a second planet gear carrier of the second planetary gearset for rotation therewith.

10. The hybrid drivetrain of claim 1, wherein the rotating component of the first planetary gearset is a first planet gear carrier of the first planetary gearset, and the rotating component of the second planetary gearset is a second sun gear of the second planetary gearset.

11. The hybrid drivetrain of claim 1, wherein the co-drive manipulator includes a third planetary gearset.

12. The hybrid drivetrain of claim 11, wherein the first input is a third planetary gear carrier of the third planetary gearset, the second input is a third sun gear of the third planetary gearset, and the rotatable shaft is driven by a third ring gear of the third planetary gearset.

13. The hybrid drivetrain of claim 12, wherein the rotatable shaft is one of co-axial and offset with respect to the third ring gear.

14. The hybrid drivetrain of claim 1, wherein the selective booster further comprises:
a rotational clutch configured to selectively fix a first ring gear of the first planetary gearset to a second planet gear carrier of the second planetary gearset for rotation therewith;
a first brake clutch configured to selectively restrict rotation of the first ring gear with respect to a stationary housing; and
a second brake clutch configured to selectively restrict rotation of the second planet gear carrier with respect to the stationary housing.

15. The hybrid drivetrain of claim 1, wherein the second electric machine is a primary electric machine of the hybrid drivetrain.

16. A hybrid vehicle, comprising:
an internal combustion engine;
a plurality of electric machines;
a co-drive manipulator having a first input configured to be driven by the internal combustion engine, and a second input configured to be driven by a first one of the plurality of electric machines; and
a selective booster including first and second planetary gearsets, each of the first and second planetary gearsets having a rotating component secured for rotation with a rotatable shaft driven by the co-drive manipulator, such that a rotational input received at the second planetary gearset from a second one of the plurality of the electric machines selectively drives the rotatable shaft with a plurality of gear ratios including at least a speed reduction gear ratio and a speed increasing gear ratio.

17. The hybrid vehicle of claim 16, further comprising:
a rotational clutch configured to selectively fix the first ring gear of the first planetary gearset to the second planet gear carrier of the second planetary gearset for rotation therewith;
a first brake clutch configured to selectively restrict rotation of the first ring gear with respect to a stationary housing; and
a second brake clutch configured to selectively restrict rotation of the second planet gear carrier with respect to the stationary housing.

18. The hybrid vehicle of claim 16, further comprising a brake clutch configured to restrict rotation of a sun gear of the first planetary gearset and a planet gear carrier of the second planetary gearset.

* * * * *